United States Patent [19]

Dolata et al.

[11] Patent Number: 4,597,178
[45] Date of Patent: Jul. 1, 1986

[54] SAW CHAIN SHARPENER

[75] Inventors: Hans Dolata, Waiblingen; Werner Meyle, Murr; Wilfried Linke, Winnenden; Hermann Hägele, Winnenden; Ernst Buck, Winnenden, all of Fed. Rep. of Germany

[73] Assignee: Andreas Stihl, Waiblingen, Fed. Rep. of Germany

[21] Appl. No.: 617,757

[22] Filed: Jun. 6, 1984

[30] Foreign Application Priority Data

Jun. 7, 1983 [DE] Fed. Rep. of Germany ....... 3320465

[51] Int. Cl.4 ....................... B23D 63/16; B26B 29/00
[52] U.S. Cl. ....................................... 30/138; 76/25 A; 30/382
[58] Field of Search ................. 76/25 A; 30/382, 138, 30/151, 504

[56] References Cited

U.S. PATENT DOCUMENTS

| 3,042,087 | 7/1962 | Otoupalik | 30/151 |
|---|---|---|---|
| 3,502,122 | 3/1970 | Silvon | 30/138 |
| 3,512,631 | 5/1970 | Price et al. | 30/151 |
| 4,369,575 | 1/1983 | Schurman | 30/151 |

FOREIGN PATENT DOCUMENTS

| 8020042 | 5/1979 | Fed. Rep. of Germany . |
|---|---|---|
| 1777472 | 2/1982 | Fed. Rep. of Germany . |

OTHER PUBLICATIONS

German Application, 2940430, 10/1979, Dolata et al.
German Application, 1,777,336, 5/1972, Oehrli.

Primary Examiner—Roscoe V. Parker
Attorney, Agent, or Firm—Walter Ottesen

[57] ABSTRACT

This disclosure is directed to a saw chain sharpener for a motor-driven chain saw having a guide bar assembly that includes a guide bar and a saw chain guidingly mounted thereon. The saw chain sharpener includes an elongated chain guard casing for removably receiving the guide bar assembly therein. The chain guard casing defines a cavity in the forward end thereof adjacent the nose of the guide bar. A sharpening device is mounted in the cavity for sharpening the saw chain whereby the device is contained within the casing.

20 Claims, 15 Drawing Figures

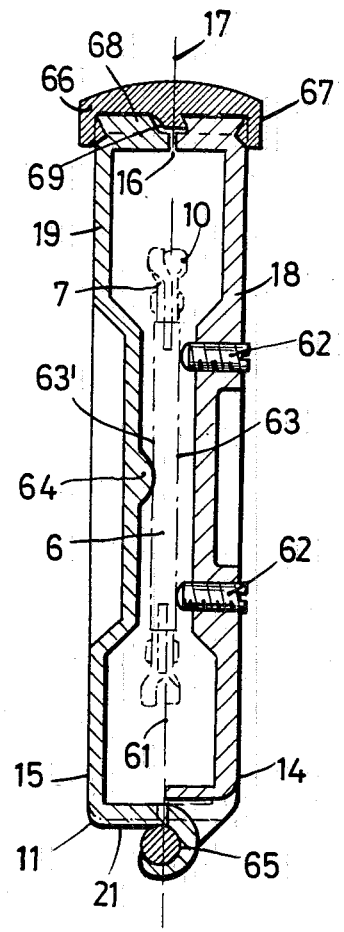
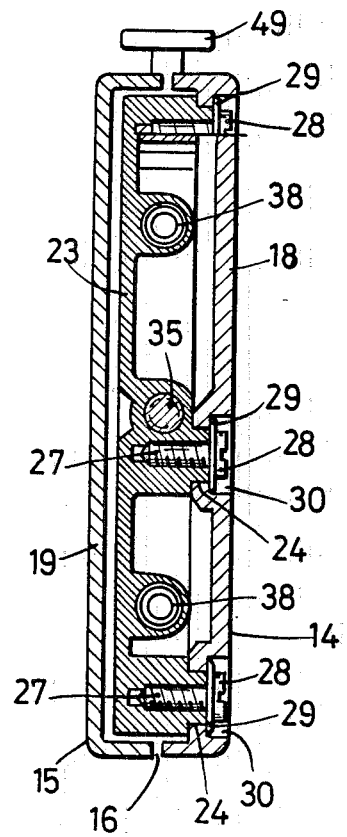
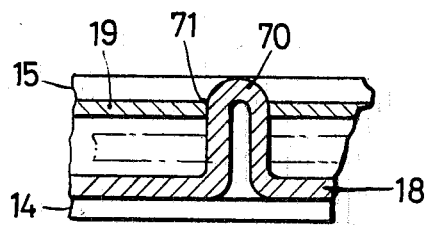
Fig. 4  Fig. 3
Fig. 5

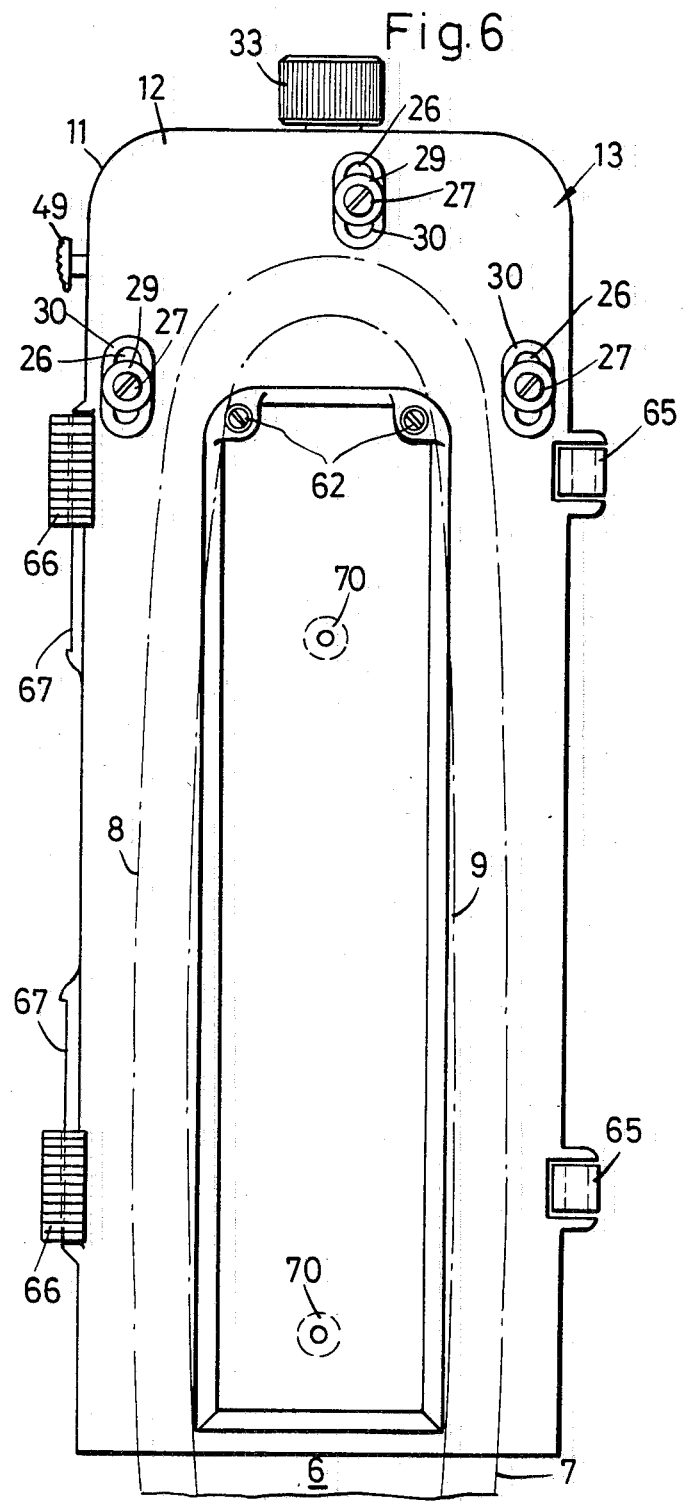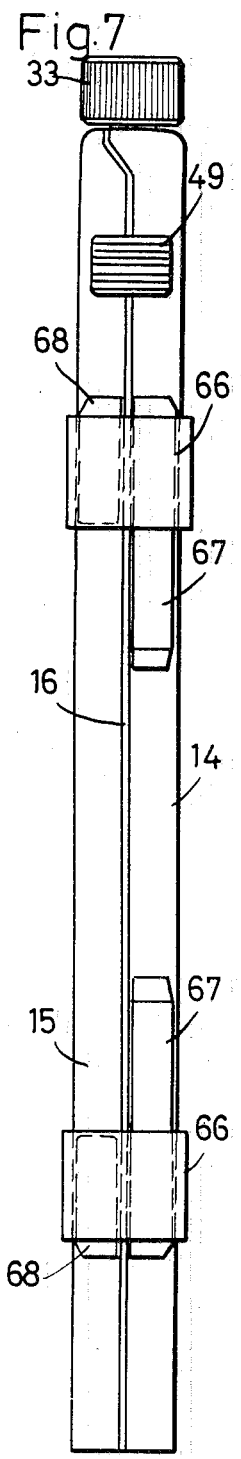

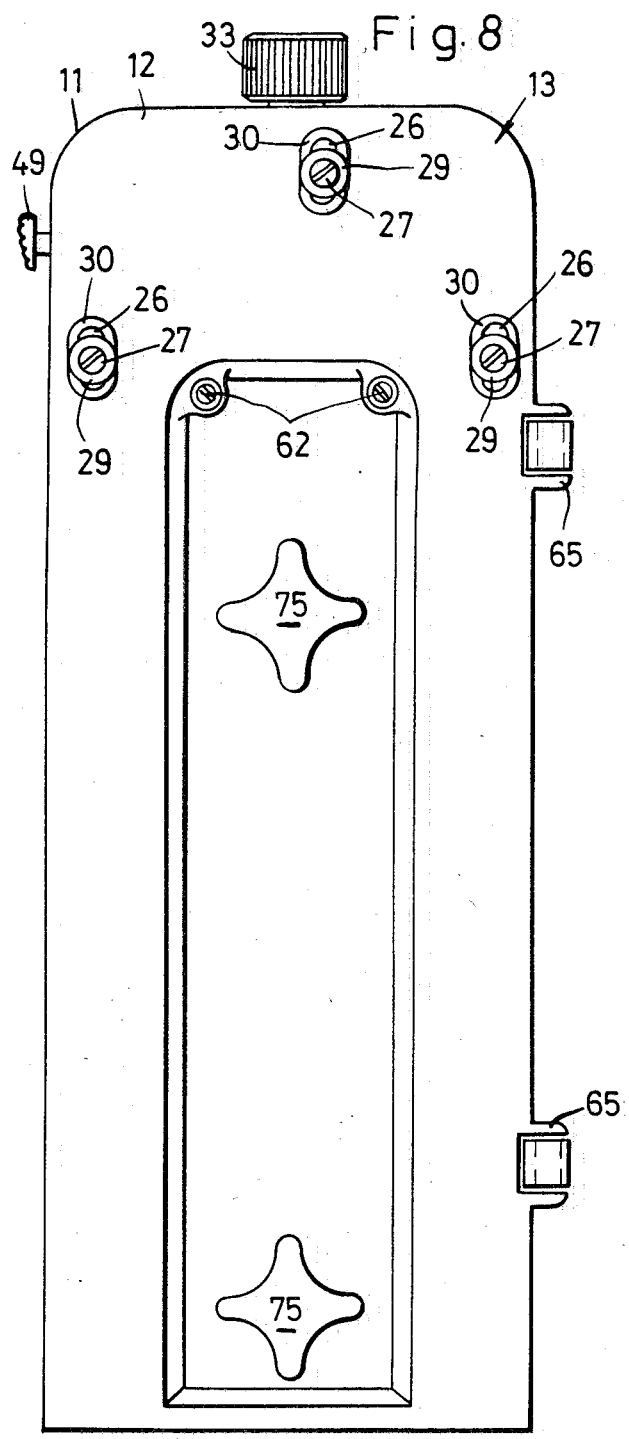
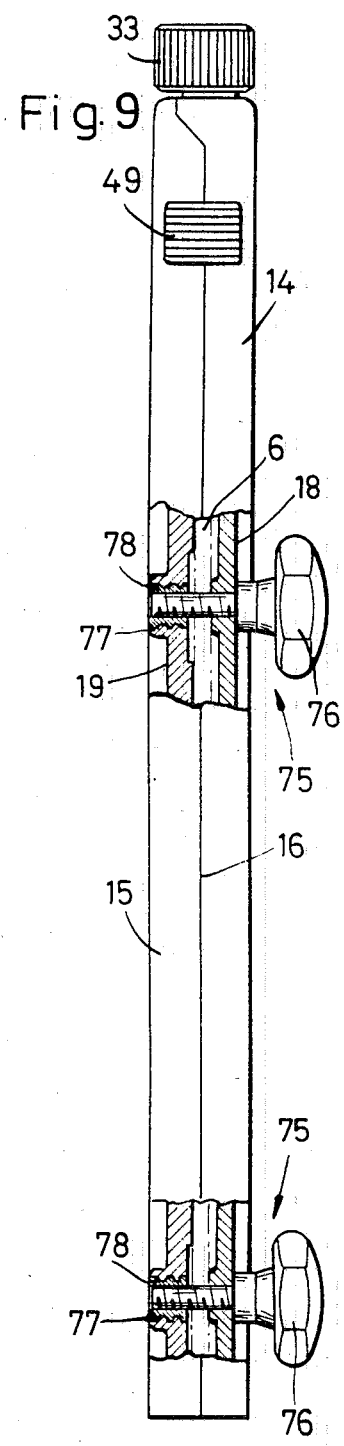

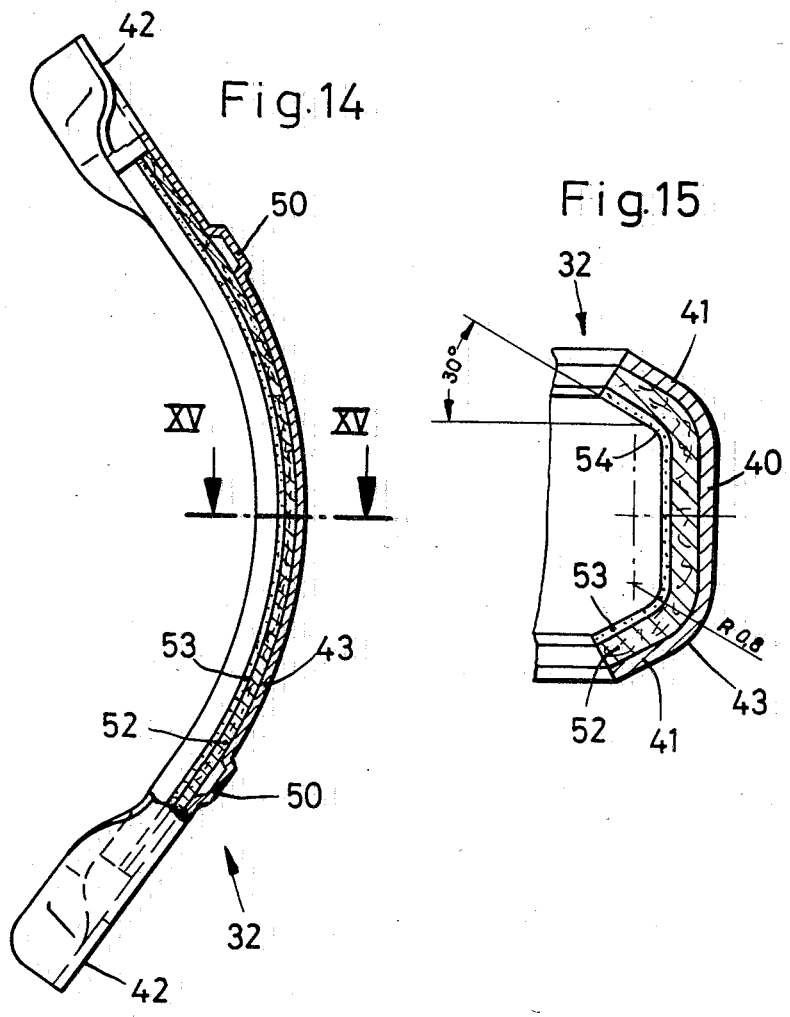

SAW CHAIN SHARPENER

FIELD OF THE INVENTION

The invention relates to a saw chain sharpener for sharpening the cutters of a saw chain of a motor-driven chain saw. The saw chain sharpener is arranged with respect to the guide bar assembly of the chain saw.

BACKGROUND OF THE INVENTION

Chain saws are provided with chain guards which are placed over the guide bar assembly when the tool is not in use. Also, chain saws have been equipped with sharpening arrangements by means of which the cutters of the saw chain moving about the guide bar can be sharpened as required. Sharpening arrangements of this kind are configured as an additional piece of equipment and are mounted on the guide bar; however, since an additional individual accessory apparatus is therefore present, the entire chain saw outfit is disadvantageously burdened therewith.

SUMMARY OF THE INVENTION

It is an object of the invention to reduce the number of pieces of accessory equipment needed for a motor-driven chain saw. It is another object of the invention to provide a saw chain sharpener which is integrated into and includes a chain guard casing. It is yet another object of the invention to provide a saw chain sharpener that affords a higher degree of safety against the danger of injury during sharpening of the saw chain.

A saw chain sharpener of the invention is for a motor-driven chain saw having a guide bar assembly that includes a guide bar and a saw chain guidingly mounted thereon for movement thereabout. The saw chain sharpener of the invention includes an elongated chain guard casing for removably receiving the guide bar assembly therein. The chain guard casing defines a cavity in the forward end thereof adjacent the nose of the guide bar. A sharpening device is mounted in the cavity for sharpening the saw chain whereby the device is contained within the casing.

BRIEF DESCRIPTION OF THE DRAWING

The invention will now be described with reference to the drawing wherein:

FIG. 3 is a section view of the front pocket defined by the chain guard casing and is taken along line III—III of FIG. 2;

FIG. 4 is a section view taken through the chain guard casing at line IV—IV of FIG. 2;

FIG. 5 is a fragmentary view, in section, of the chain guard casing taken along line V—V of FIG. 2 and showing a cam-shaped projection for mounting the chain guard casing on the guide bar assembly;

FIG. 6 is a side elevation view of the chain guard casing showing slide latches mounted at the top peripheral edge thereof;

FIG. 7 is a plan view of the top longitudinal edge of the chain guard casing;

FIG. 8 is an elevation view of a further embodiment of the chain guard casing showing screw latches arranged at the longitudinal mid region thereof;

FIG. 9 is a plan view of the upper longitudinal edge of the chain guard casing of FIG. 8 with portions broken out to show the screw latches;

FIG. 14 is an enlarged longitudinal section of the sharpening unit of the sharpening device of FIG. 2; and, FIG. 15 is an enlarged section view of the sharpening element taken along the line XV—XV of FIG. 14.

DESCRIPTION OF THE PREFERRED EMBODIMENTS OF THE INVENTION

Figure 1:
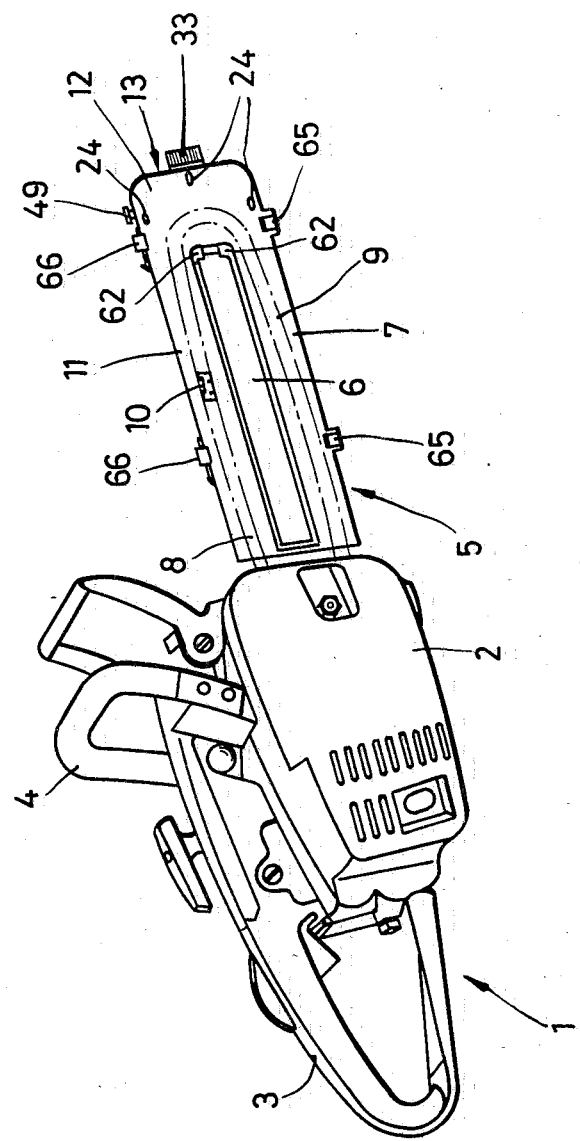
FIG. 1 is a perspective view of a motor-driven chain saw equipped with a saw chain sharpener according to the invention.

The motor-driven chain saw of FIG. 1 is identified by reference numeral 1 and includes a motor housing 2 wherein a drive motor is mounted such as a single-cylinder two-stroke engine, for example. A handle 3 is provided at the rear end of the chain saw 1 and is mounted on the motor housing 2. A front handle 4 configured as a bale handle extends over the motor housing 2 at approximately the mid region thereof and is arranged to be transverse to the longitudinal direction of handle 3.

The chain saw 1 is provided with a guide bar assembly 5 which extends in the forward direction and is at the side of the motor housing 2 away from the handle 3. The guide bar assembly 5 essentially includes a guide bar 6 and a saw chain 7 guided for movement about the periphery of the guide bar and driven by the drive motor. The direction of movement of the saw chain 7 is changed at the free end of the guide bar assembly 5 so that the top run 8 of the saw chain 7 moves in the forward direction and the bottom run 9 runs back toward the motor housing 2. The saw chain 7 includes a plurality of cutters 10 which must be resharpened after they have become worn and blunted.

For sharpening the cutters 10, the chain saw 1 as shown in FIG. 1 is provided with a saw chain sharpener which includes a chain guard casing 11 which is configured to define an elongated pocket and is preferably made of plastic. The chain guard casing 11 encloses substantially the entire guide bar assembly 5 and serves on the one hand to protect the saw chain 7 against possible damage while at the same time preventing an inadvertent contact therewith by the person operating the chain saw. In addition, a sharpening device 13 is integrated into the chain guard casing 11 at the region of the base of the pocket 12 whereat the nose of the guide bar assembly 5 is disposed and whereat the saw chain is directed back to the chain saw housing. The cutters 10 of the saw chain 7 are sharpened by the sharpening device 13 at the top plates thereof as well as the side plates of the cutters whereby the depth gage of each cutter can be filed down to the correct setting.

The chain guard casing 11 is configured as a two-part pocket, and includes a first half shell 14 and a second half shell 15 directly adjacent thereto. The two half shells 14 and 15 conjointly define a partition plane 16 which lies substantially in the central plane 17 between the side wall 18 of the half shell 14 and the side wall 19 parallel thereto of the second half shell 15. The two half shells 14 and 15 conjointly define the narrow upper longitudinally extending wall 20, the lower narrow longitudinally extending wall 21 and the narrow front end wall 22 of the chain guard casing 11.

A slider 23 is arranged on the inner surface of side wall 18 of the half shell 14 and is preferably made of plastic. Referring to FIG. 3, three guide pins 24 are formed on the slider 23 which has a C-shaped form. A guide pin 24 is arranged at each one of the end regions of the legs 25 of the slider 23. The third guide pin 24 is disposed approximately at the mid region of the slider 23. The guide pins 24 of the slider 23 slidably engage longitudinal slots 26 which extend parallel to each other in the longitudinal direction of the chain guard casing 11. The slots 26 are formed in the side wall 18 of half shell 14. The slider 23 is held to the side wall 18 by means of the screws 27. The screws 27 threadably engage an internal thread in the guide pins 24 and are tightly held therein. This arrangement is configured so that the head 28 of the screws 27 and a washer 29 are disposed in recesses 30 formed in the outer surface of the side wall 18.

An arcuately-shaped sharpening unit 32 is mounted at the concave end face 31 of the C-shaped slider 23 which faces toward the saw chain 7. By means of the guide pins 24 journalled in the mutually parallel slotted openings 26, a precise parallel guidance of the slider 23 and its sharpening unit 32 is obtained simultaneously in the direction of the longitudinal axis of the guide bar assembly 5 and in the direction of the longitudinal axis of the chain guard casing 11. Accordingly, no one-sided loading action can occur when the saw chain 7 is sharpened.

An adjusting screw 33 is provided at the end wall 22 of the chain guard casing 11 for obtaining a precise adjustment of the slider 23 or, more specifically, of the sharpening element 32 of the sharpening device 13. This adjusting screw 33 includes a grip 34 which is disposed outside of the chain guard casing 11 and in front of the end face wall 22. The threaded end 35 of the adjusting screw 33 is arranged to be coaxial to the longitudinal axis of the guide bar assembly 5 and threadably engages an internal thread 36 of the slider 23.

Figure 2:
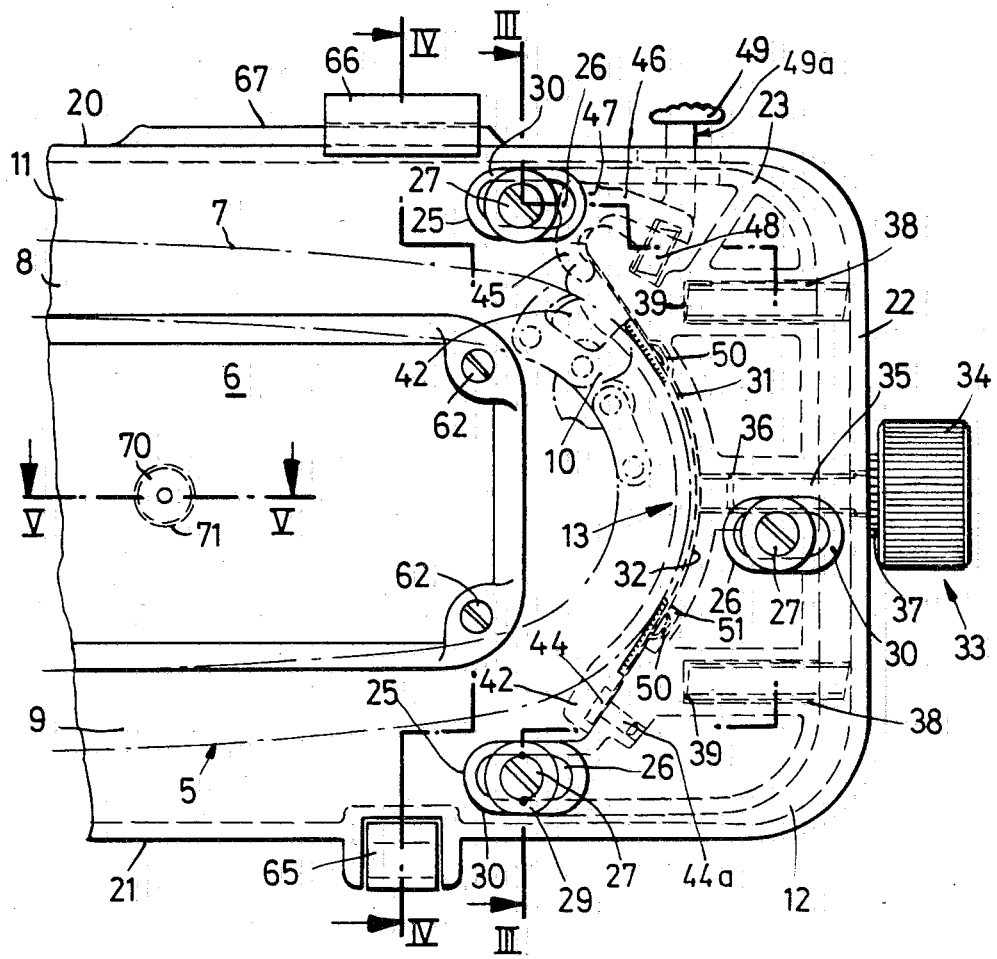
FIG. 2 is a side elevation view of the front portion of the saw chain sharpener showing the sharpening device thereof arranged in the front end of the chain guard casing.

To prevent the adjusting screw 33 from becoming inadvertently displaced, a detent stop device 37 is provided to prevent an inadvertent rotation of the adjusting screw 33 and is arranged in the region between the grip 34 and the end face wall 22. The slider 23 is continuously biased in the direction of the saw chain 7 by spring means so that a displacement of the slider 23 by means of the adjusting screw 33 in the direction of the saw chain 7 occurs with the support of the spring means; whereas, a displacement away from the saw chain 7 must be conducted against the force of the spring means. The spring means which act on the slider 23 can be in the form of two mutually parallel helical coil compression springs 38 as shown in the embodiment of FIG. 2. The compression springs 38 are disposed on respective sides of the adjusting screw 33 and are spaced one from the other. The compression springs 38 are seated in blind bores 39 of the slider 23 and respective ends thereof lie against the inner surface of end wall 22 of the chain guard casing 11. The sharpening unit 32 can be conically tapered toward its center at the region where the saw chain enters or leaves in order to obtain a centering thereof on the unit.

Referring to FIG. 15, the arcuately-shaped sharpening unit 32 mounted on the concave surface 31 of the C-shaped slider 23 has a substantially U-shaped cross-section and has a base 40 with two side legs 41 extending upwardly therefrom at an angle of approximately 30°. The sharpening unit 32 is secured at its two longitudinal ends in the vicinity of both legs 25 of the slider 23. In this connection, a fork-like end 42 of a carrier 43 of the sharpening unit 32 is releasably mounted behind the head 44 of a screw 44a. The screw 44a is mounted in the concave surface 31 in the vicinity of the legs 25 of the slider 23. At the other end of the carrier 43, there is likewise a fork-like end portion and this is held under a hook-like portion 45 of a clamping lever 46 mounted in the slider 23. The clamping lever 46 is pivotly mounted about an axis 47 and is spring biased by a compression spring 48 which is held on the slider 23. The spring 48 acts on the clamping lever 46 to cause the hook-like portion 45 to hold the fork-like end 42 of the sharpening element 32. To facilitate a quick exchange of the sharpening unit 32, as for example in the case where it has been worn, the clamping lever 46 has an end portion 49a on which a flat 49 is formed to which a pressing force can be manually applied. The end portion 49a with the flat 49 projects from the upper wall 20 of the chain guard casing 11.

The carrier 43 of the sharpening unit 32 has two projections 50 at its rear surface which engage openings 51 in the region of the concave end face 31 of the slider 23. In addition, the sharpening unit 32 has a fiber layer 52 and a grinding layer 53. The fiber layer 52 which carries the grinding layer 53 is preferably secured to the inner surface of the carrier 43 by means of an adhesive material. The shape of the sharpening unit 32 is so configured with respect to the cross-section thereof that the grinding layer 53 is provided with rounded corners 54 at the transition region between the base 40 and the side legs 41. The rounded corners have a radius of approximately 0.8 millimeter. By means of this cross-sectional configuration of the sharpening unit 32, an excellent sharpening of the top plates as well as of the side plates of the cutters 10 is ensured.

The sharpening unit 32 with the carrier 43, the two fork-like end portions 42, the projections 50, the fiber layer 52 and the grinding layer 53 are so formed that the sharpening unit 32 can be selectively secured to the concave end face 31 of the slider 23 irrespective of the orientation of the unit with respect to the concave surface 31. Accordingly, when the sharpening unit is removed and a replacement inserted, the operator need not be concerned in which direction the sharpening unit 32 is placed in position. The clear width in the U-shaped cross-section of the sharpening unit 32 between the side legs 41 can be different for different sharpening units 32. Preferably, four sharpening unit configurations can be provided having four different cross-sections, respectively, which can be finely graded one with respect to the other. In this way, the advantage is obtained that a precise adaptation of the appropriate sharpening unit to the different degrees of wear condition of the cutters 10 of the saw chain 7 is possible so that the saw chain can be optimally utilized.

Figure 10:
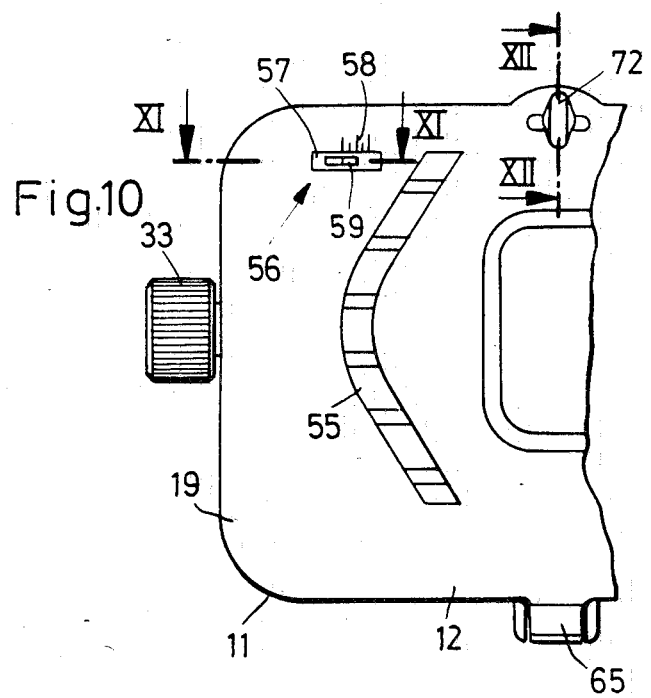
FIG. 10 is a left side elevation view of the forward end portion of the chain guard casing showing a rotatable knob latch in the immediate vicinity of the upper longitudinal edge thereof and showing a position indicator for the sharpening device as well as a viewing opening for observing the grinding action.
Figure 11:
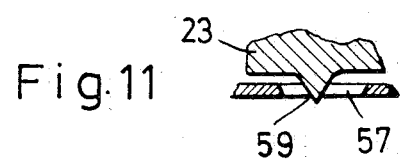
FIG. 11 is a fragmentary view of the position indicator taken along line XI—XI of FIG. 10.

Referring now to FIGS. 10 and 11, a viewing window 55 is formed in the side wall 19 of half shell 15 of the chain guard casing 11 through which the sharpening unit 32 can be observed. For this purpose, the viewing window 55 in the side wall 19 is arcuately shaped so that it substantially follows the sharpening unit 32 and is in approximate alignment therewith. Furthermore, a position indicator 56 is mounted on the side wall 19 of the half shell 15 by means of which the position of the sharpening device 13 can be precisely read. The position indicator 56 of the sharpening device 13 includes an indicator window 57 formed in the side wall 19. At the upper edge of the indicator window 57, a set of scale graduations 58 are formed. An indicator 59 is formed on the slider 23 and can be recognized in the indicator window 57. When the slider 23 is displaced via the adjusting screw 33, the indicator 59 likewise is displaced in the indicator window 57. The change in position can be precisely read off of the scale graduations 58 so that a continuous control of the sharpening device 13 is provided.

Referring to FIG. 4, the center plane 17 is shown extending vertically in the partition plane 16 and through the guide bar assembly 5 as well as the upper run 8 and lower run 9 of the saw chain. This center plane 17 is fully coincident with the longitudinal central plane 61 of the sharpening unit 32 whereby a precise alignment of the sharpening unit 32 on the saw chain 7 is ensured. In this way, the resharpening of the cutters will be fully uniform.

The coincidence of the central plane 17 of the guide bar assembly 5 with the longitudinal central plane 61 of the sharpening unit 32 is preferably set at the factory. For this purpose, two adjustable screws 62 are arranged in the side walls 18 of the half shells 14 in spaced relationship one with respect to the other. The screws 62 threadably engage corresponding internal threads and can be rotated to lie against the wide side 63 of the guide bar 6.

On the side wall 19 of half shell 15 lying on the opposite side of the guide bar, an abutment 64 is formed in the central region between the two adjusting screws 62 and lies against the other flat side 63' of the guide bar 6. The adjusting screws 62 are sealed at the factory with a lacquer or other suitable material after they have been adjusted so that they will not later be inadvertently displaced. It is also possible to use a lock nut, for example, on the adjusting screw 62 or other means can be used to prevent the adjusting screw from rotating after it has been set at the factory.

The half shell 14 and the half shell 15 of the chain guard casing are connected with one another at the lower longitudinal wall 21 thereof by means of two hinges 65. On the upper longitudinal wall 20, two releasable latches are provided which, in the embodiment according to FIGS. 1 to 5, are in the form of slide latches 66. The slide latches 66 are slidably guided on the half shell 14 by means of a dove-tail molding 67. A longitudinal projection 68 is provided on the half shell 15 and is engaged by the slide members 66 when the chain guard casing 11 is locked.

Referring to FIG. 5, two fixing cam-shaped projections 70 are formed on the side wall 18 of half shell 14 in the region of the longitudinal center axis of the chain guard casing 11. The fixing projections 70 are disposed in spaced relationship to each other and penetrate respective bores in the guide bar 6 to engage respective fixing bores 71 formed in the side wall 19 of half shell 15.

Figure 12:
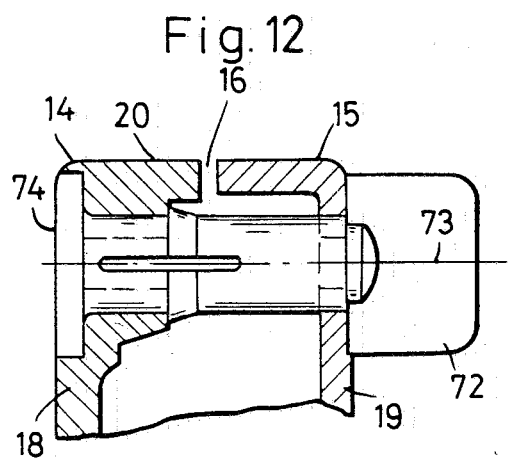
FIG. 12 is an enlarged partial view of the rotatable knob latch taken along line XII—XII of FIG. 10.
Figure 13:
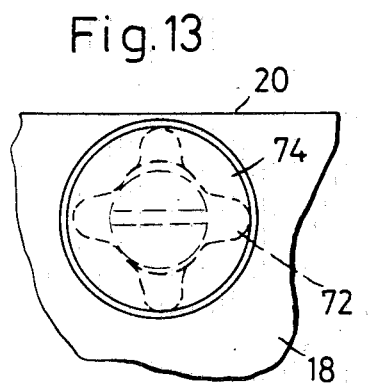
FIG. 13 is a partial view of the rear end of the rotatable knob latch of FIG. 12.

In the embodiment according to FIGS. 10, 12 and 13, the latching means of the chain guard casing 11 is in the form of a knob latch 72 which is arranged in the vicinity of the upper longitudinal edge wall 20 of the chain guard casing 11. The knob latch 72 can be rotated 90° about a journalling axis 73 extending transverse to the plane of the chain guard casing 11, so that, in one rotation position of the knob latch 72, the knob latch is released; whereas, in the rotation position displaced 90° from the first position, the knob latch 72 is blocked and the half shell 14 and the half shell 15 are pressed tight against each other. The knob latch 72 can have a rotatable foot 74 which can be journalled in the side wall 18 so that the knob latch 72 can be actuated at the side wall 19 of half shell 15.

In the embodiment of FIGS. 8 and 9, two screw latches 75 for the chain guard casing 11 are shown in the region of the longitudinal central axis thereof. Each screw latch 75 has a rotation grip 76 on the side wall 18 of the half shell 14. A threaded portion 77 of the screw latch 75 penetrates the side wall 18, the guide bar 6 and the side wall 19 of the adjacent half shell 15 whereat it threadably engages an internal thread 78.

Before the chain saw is utilized for cutting operations, the chain guard casing 11 is removed from the guide bar assembly 5 by loosening the screw latches 75. On the other hand, to sharpen the saw chain 7, the chain guard casing 11 with the integrated sharpening device 13 is mounted on the guide bar assembly 5. The sharpening unit 32 can be displaced against the saw chain 7 with sensitivity by means of the adjusting screw 33 until the first grinding spark is recognized in the viewing window 55. A precisely guided translational displacement of the slider 23 is obtained via the three guide pins 24 in their respective mutually parallel elongated slots 26 when the sharpening device 13 is displaced. The two compression springs 38 press the slider 23 uniformly against the moving saw chain 7 because of their disposition and dimensioning. The adjustment of the adjusting screw 33 and the detent stop device 37 provided thereon ensure an exact determination of how much material is ground from the saw chain 7. By means of the angularly-shaped clamping lever 46, a fast and simple exchange of the sharpening unit 32 is provided.

The sharpening device 13 can already be adjusted at the factory by means of the adjusting screws 62 so that the center region of the sharpening unit 32 and the saw chain 7 are aligned with respect to each other thereby eliminating manufacturing tolerances. The position of the sharpening unit 32 with respect to the saw chain 7 is clearly recognizable on the position indicator 56. Preferably, four differently configured sharpening units 32 can be placed into the sharpening device 13 which have the same overall configuration and which, however, can be provided with cross-sections of different widths in order to take account of the different degrees of wear of the cutters 10. Because of the parallel guided journalling of the slider 23, an even and effective use of the sharpening unit 32 is provided since the latter is always coaxial to the saw chain 7 moving about the end of the guide bar 6.

An integrated arrangement of the sharpening device 13 in the chain guard casing 11 ensures a simple and safe operation by means of which the danger of injury during sharpening of the saw chain 7 is substantially eliminated. In the event that the cutters 10 have become worn, the chain guard casing 11 with the sharpening arrangement 13 mounted in the end portion 12 thereof can be quickly mounted on the guide bar assembly 5 without difficulty.

The saw chain sharpener of the invention can be adapted to guide bars having different lengths. For example, one or more extension pieces can be provided which can be mounted in a simple manner on the chain guard casing 11 and, as required, be secured thereto with suitable means.

The chain guard casing in and of itself constitutes an excellent guard for the saw chain. There is complete clearance with respect to the saw chain when the jacket is in position on the guide bar so that no damage can occur to either the chain guard casing or the saw chain in the event that the chain guard casing is inadvertently left in position on the guide bar assembly when the chain saw motor is started.

It is understood that the foregoing description is that of the preferred embodiments of the invention and that various changes and modifications may be made thereto without departing from the spirit and scope of the invention as defined in the appended claims.

What is claimed is:

1. A saw chain sharpener for a motor-driven chain saw having a motor housing and a guide bar assembly that includes a guide bar having an exposed portion extending outwardly from the housing and a saw chain guidingly mounted thereon for movement thereabout, the saw chain sharpener comprising:

an elongated chain guard casing for removably receiving and enclosing the guide bar assembly therein over substantially the entire exposed portion of the guide bar; said chain guard casing having side walls facing toward respective flat surfaces of the guide bar and defining a cavity in the forward end of said casing adjacent the nose of the guide bar; and a sharpening device mounted in said cavity for sharpening the saw chain whereby said device is contained within said casing, said sharpening device including:

a slider slidably mounted on one of said side walls for sliding movement in said cavity;

an arcuate sharpening unit rigidly mounted on said slider;

adjustment means for manually adjusting the position of said slider so as to move said sharpening unit into contact engagement with the saw chain as the latter moves about the nose of the guide bar; and, guide means formed in said one side wall for slidably engaging said slider at opposite ends thereof so as to prevent rotational movement of said slider and said arcuate sharpening unit relative to the guide bar as said sharpening unit comes into contact engagement with the saw chain.

2. A saw chain sharpener for a motor-driven chain saw having a guide bar assembly that includes a guide bar and a saw chain guidingly mounted thereon for movement thereabout, the saw chain sharpener comprising:

an elongated chain guard casing for removably receiving the guide bar assembly therein; said chain guard casing defining a cavity in the forward end thereof adjacent the nose of the guide bar; and, a sharpening device mounted in said cavity for sharpening the saw chain whereby said device is contained within said casing, the sharpening device including:

a slider slidably mounted in said cavity;

an arcuate sharpening unit mounted on said slider;

adjustment means for manually adjusting the position of said slider so as to move said sharpening unit into contact engagement with the saw chain as the latter moves about the nose of the guide bar, and, guiding means for slidably guiding said slider in said casing in the direction of the longitudinal axis of the guide bar assembly; and, said casing having two mutually adjacent side walls disposed on respective sides of the guide bar; and, said parallel guiding means comprising: at least two mutually parallel tracks formed in one of said side walls; and, first engagement means formed on said slider for slidably engaging one of said tracks and second engagement means formed on said slider for engaging the other one of said tracks.

3. A saw chain sharpener for a motor-driven chain saw having a guide bar assembly that includes a guide bar and a saw chain guidingly mounted thereon for movement thereabout, the saw chain sharpener comprising:

an elongated chain guard casing for removably receiving the guide bar assembly therein; said chain guard casing defining a cavity in the forward end thereof adjacent the nose of the guide bar; and, a sharpening device mounted in said cavity for sharpening the saw chain whereby said device is contained within said casing, the sharpening device including:

a slider slidably mounted in said cavity;

an arcuate sharpening unit mounted on said slider;

adjustment means for manually adjusting the position of said slider so as to move said sharpening unit into contact engagement with the saw chain as the latter moves about the nose of the guide bar, and, said chain guard casing including two side walls disposed on respective flat sides of the guide bar assembly and a peripheral edge wall connecting said side walls, said peripheral edge wall including a wall segment defining the forward end wall of said casing; and, said adjustment means including an adjustable screw rotatably mounted in said forward end wall and threadably engaging said slider for displacing the latter in the direction of the longitudinal axis of the guide bar assembly.

4. The saw chain sharpener of claim 3, said sharpening device comprising: spring means for spring biasing said slider toward the saw chain.

5. The saw chain sharpener of claim 4, said spring means being two mutually adjacent compression springs arranged in spaced relationship to each other between said slider and said forward end wall.

6. The saw chain sharpener of claim 1, said sharpening device comprising:

holding means for removably holding said sharpening unit in position on said slider whereby said sharpening unit can be exchanged for a fresh unit when worn;

said arcuate sharpening unit being configured as a channel and having a substantially U-shaped cross-section; and, a plurality of said sharpening units having respectively different clear widths between the legs of said channel whereby said units can be selectively mounted on said slider to accommodate different stages of wear of the cutters of the saw chain.

7. A saw chain sharpener for a motor-driven chain saw having a guide bar assembly that includes a guide bar and a saw chain guidingly mounted thereon for movement thereabout, the saw chain sharpener comprising:
- an elongated chain guard casing for removably receiving the guide bar assembly therein; said chain guard casing defining a cavity in the forward end thereof adjacent the nose of the guide bar; and,
- a sharpening device mounted in said cavity for sharpening the saw chain whereby said device is contained within said casing, said sharpening device including:
- a slider slidably mounted in said cavity;
- an arcuate sharpening unit mounted on said slider;
- adjustment means for manually adjusting the position of said slider so as to move said sharpening unit into contact engagement with the saw chain as the latter moves about the nose of the guide bar, and
- said casing having two mutually adjacent side walls disposed on respective sides of the guide bar; said casing having a viewing window formed in one of said side walls in the region of said cavity so as to permit viewing of said arcuate sharpening unit.

8. The saw chain sharpener of claim 7 comprising: position indicator means for indicating the position of said slider and said sharpening unit with respect to the saw chain.

9. A saw chain sharpener for a motor-driven chain saw having a guide bar assembly that includes a guide bar and a saw chain guidingly mounted thereon for movement thereabout, the saw chain sharpener comprising:
- an elongated chain guard clam-shell casing for removably receiving the guide bar assembly therein; said clam-shell casing defining a cavity in the forward end thereof adjacent the nose of the guide bar; and,
- a sharpening device disposed in said cavity for sharpening the saw chain whereby said device is contained within said casing;
- said clam-shell casing including two half shells conjointly defining said casing and conjointly defining a partition plane therebetween; said half shells each having mutually parallel side walls disposed adjacent respective flat sides of the guide bar when said casing is in the closed position and mounted thereon; said partition plane being substantially coincident with a central plane passing between said side walls; and,
- said sharpening device including: a slider slidably mounted in one of said half shells; an arcuate sharpening unit mounted on said slider; guiding means arranged on said slider and in said one half shell for slidably guiding said slider in said casing in the direction of the longitudinal axis of the guide bar; and, an adjustable screw rotatably mounted in said one half shell and threadably engaging said slider for displacing the latter in the direction of said longitudinal axis.

10. The saw chain sharpener of claim 9, the saw chain defining an outgoing upper run along the top of the guide bar and a return lower run along the bottom of the guide bar; said upper run and said lower run being disposed in said central plane; said sharpening unit defining a longitudinally extending sharpening plane; said saw chain sharpener further comprising sharpening adjusting means for factory adjusting the position of said sharpening unit so as to cause said sharpening plane to be coincident with said central plane whereby a uniform two-side sharpening of the saw chain is obtained.

11. The saw chain sharpener of claim 10, said sharpening means including abutment means arranged on the inside wall of one of said half shells for abutting against one flat side of the guide bar; and, two adjusting screws mounted in the side wall of the other one of said half shells in spaced relationship to each other for contacting the other flat surface of the guide bar whereby the position of said sharpening plane is brought into coincidence with said central plane by factory adjusting the respective positions of said last-mentioned screws.

12. The saw chain sharpener of claim 9, said elongated clam-shell casing being a flat body having a narrow longitudinally extending top wall and a narrow longitudinally extending bottom wall; hinge means formed on said bottom wall for hinge-connecting said half shells to each other; and, releasable latching means formed on said top wall for latching said half shells to each other when said casing is in the closed position.

13. The saw chain sharpener of claim 9, wherein the guide bar has aperture means formed therein, one of said half shells having fixing bore means formed therein, and the other one of said half shells having fixing projection means formed thereon for penetrating said aperture means and engaging said bore means when said casing is in the closed position and mounted on the guide bar thereby fixing the position of said casing with respect to the guide bar.

14. The saw chain sharpener of claim 12, said top wall being conjointly defined by longitudinally extending juxtaposed top wall portions of said half shells, respectively, said releasable latching means including: a dove-tail projection formed on the top wall portion of one of said half shells; a slide latch having two grooves formed therein and slidably engaging said dove-tail projection with one of said grooves; and, a projection formed on the top wall portion of the other one of said half shells for engaging the other one of said grooves in said slide latch when said latching means is in the latched position.

15. The saw chain sharpener of claim 12, said releasable latching means being disposed in the vicinity of said top wall and including: a rotatable latch rotatably mounted in the side wall of one of said half shells; and, slot means formed in the side wall of the other one of said half shells for receiving said rotatable latch therein whereby said latching means is closed by rotating said rotatable latch after placing the same in said slot means.

16. The saw chain sharpener of claim 12, wherein the guide bar is provided with bore means formed therein; said releasable latching means being disposed in the vicinity of the longitudinal center axis of said casing and including: thread means formed in the side wall of one of said half shells; and, a rotatable knob mounted in the side wall of the other one of said half shells and having a threaded shaft extending therefrom for penetrating said bore means and threadably engaging said thread means when said latching means is in the latched position.

17. A chain guard casing for a motor-driven chain saw having a motor housing and a guide bar assembly that includes a guide bar having an exposed portion extending outwardly from the motor housing and a saw chain guidingly mounted thereon for movement thereabout, the chain guard casing comprising:
- two half shells conjointly defining the casing in the form of a clam-shell housing for removably receiving and enclosing the guide bar assembly therein over substantially the entire exposed length of the guide bar; and, fixing means for fixing the position of said half shells with respect to said guide bar when mounted thereon so as to provide sufficient clearance between said casing and the saw chain whereby damage to the casing and the saw chain is prevented in the event the chain saw is actuated while the casing is still mounted on the guide bar assembly.

18. The chain guard casing of claim 17, wherein the guide bar has two apertures formed therein in spaced relationship to each other along the length of the guide bar, said fixing means including two stub-like fixing projections formed on one of said half shells for penetrating said apertures, respectively, thereby fixing the position of said casing with respect to the guide bar.

19. A chain guard casing for a motor-driven chain saw having a guide bar assembly that includes a guide bar with aperture means formed therein and a saw chain guidingly mounted thereon for movement thereabout, the chain guard casing comprising:

two half shells conjointly defining the casing in the form of a clam-shell housing for removably receiving the guide bar assembly therebetween;

fixing means for fixing the position of said half shells with respect to said guide bar when mounted thereon so as to provide sufficient clearance between said casing and the saw chain whereby damage to the casing and the saw chain is prevented in the event the chain saw is actuated while the casing is still mounted on the guide bar assembly; said fixing means including: fixing bore means formed in one of said half shells; and, fixing projection means formed on the other one of said half shells for penetrating said aperture means and engaging said bore means when said casing is closed and mounted on the guide bar thereby fixing the position of said casing with respect to the guide bar; and, said elongated clam-shell casing being a flat body having a narrow longitudinally extending top wall and a narrow longitudinally extending bottom wall;

hinge means formed on said bottom wall for hinge-connecting said half shells to each other; and, releasable latching means for latching said half shells to each other when said casing is in the closed position.

20. The chain guard casing of claim 18, said fixing means further comprising two fixing bores in the other one of said half shells for engaging respective ones of said stub-like projections when said casing is closed.

* * * * *

UNITED STATES PATENT AND TRADEMARK OFFICE
CERTIFICATE OF CORRECTION

PATENT NO. : 4,597,178
DATED : July 1, 1986
INVENTOR(S) : Hans Dolata et al

It is certified that error appears in the above-identified patent and that said Letters Patent is hereby corrected as shown below:

In column 11, line 24: delete "therebetween;" and substitute -- therein; -- therefor.

Signed and Sealed this

Twenty-third Day of September 1986

[SEAL]

Attest:

DONALD J. QUIGG

Attesting Officer

Commissioner of Patents and Trademarks